United States Patent
Essa et al.

(10) Patent No.: US 12,526,652 B2
(45) Date of Patent: Jan. 13, 2026

(54) SYSTEMS AND METHODS FOR CARRIER AGGREGATION COMBINATION USING DEVICE DATA AND NETWORK DATA

(71) Applicant: Verizon Patent and Licensing Inc., Basking Ridge, NJ (US)

(72) Inventors: Ammara Essa, Los Angeles, CA (US); Timothy E. Coyle, Chicopee, MA (US); Hector A. Garcia Crespo, N Richland Hills, TX (US); Matthew Kapala, North Billerica, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 502 days.

(21) Appl. No.: 18/061,772

(22) Filed: Dec. 5, 2022

(65) Prior Publication Data
US 2024/0187875 A1 Jun. 6, 2024

(51) Int. Cl.
*H04W 24/02* (2009.01)
*H04W 72/0453* (2023.01)
*H04W 72/56* (2023.01)

(52) U.S. Cl.
CPC ....... *H04W 24/02* (2013.01); *H04W 72/0453* (2013.01); *H04W 72/56* (2023.01)

(58) Field of Classification Search
CPC . H04W 24/02; H04W 72/0453; H04W 72/56; H04W 72/51
See application file for complete search history.

(56) References Cited

U.S. PATENT DOCUMENTS

| | | | | |
|---|---|---|---|---|
| 2015/0173094 A1* | 6/2015 | Vangala | ................ | H04W 72/56 370/329 |
| 2016/0127055 A1* | 5/2016 | Dayal | ................... | H04L 5/0085 370/252 |
| 2017/0238316 A1* | 8/2017 | Li | ..................... | H04W 72/0453 370/329 |
| 2018/0219652 A1* | 8/2018 | Chen | ................... | H04W 88/023 |
| 2023/0239705 A1* | 7/2023 | Gronstad | .............. | H04W 16/10 370/329 |

FOREIGN PATENT DOCUMENTS

EP 2957923 A1 * 12/2015 ............. G01S 5/021

* cited by examiner

*Primary Examiner* — Ayaz R Sheikh
*Assistant Examiner* — David Zhijun Sun

(57) ABSTRACT

A carrier aggregation platform may obtain device data regarding first UEs associated with a geographical area and determine a data distribution of make and model combinations of the first UEs. The platform may analyze the data distribution to identify one or more make, model and/or software combinations that satisfy a threshold and determine carrier aggregation capabilities of UEs of the one or more make and model combinations. The platform may determine, based on the carrier aggregation capabilities, one or more combinations of frequency bands and a number of downlinks for the frequency bands. The platform may obtain network data indicating a carrier aggregation capability of a base station associated with the geographical area. The platform may determine carrier aggregation information based on the carrier aggregation capability, the one or more combinations of frequency bands, and the number of downlinks. Second UEs may be configured based on the carrier aggregation information.

20 Claims, 10 Drawing Sheets

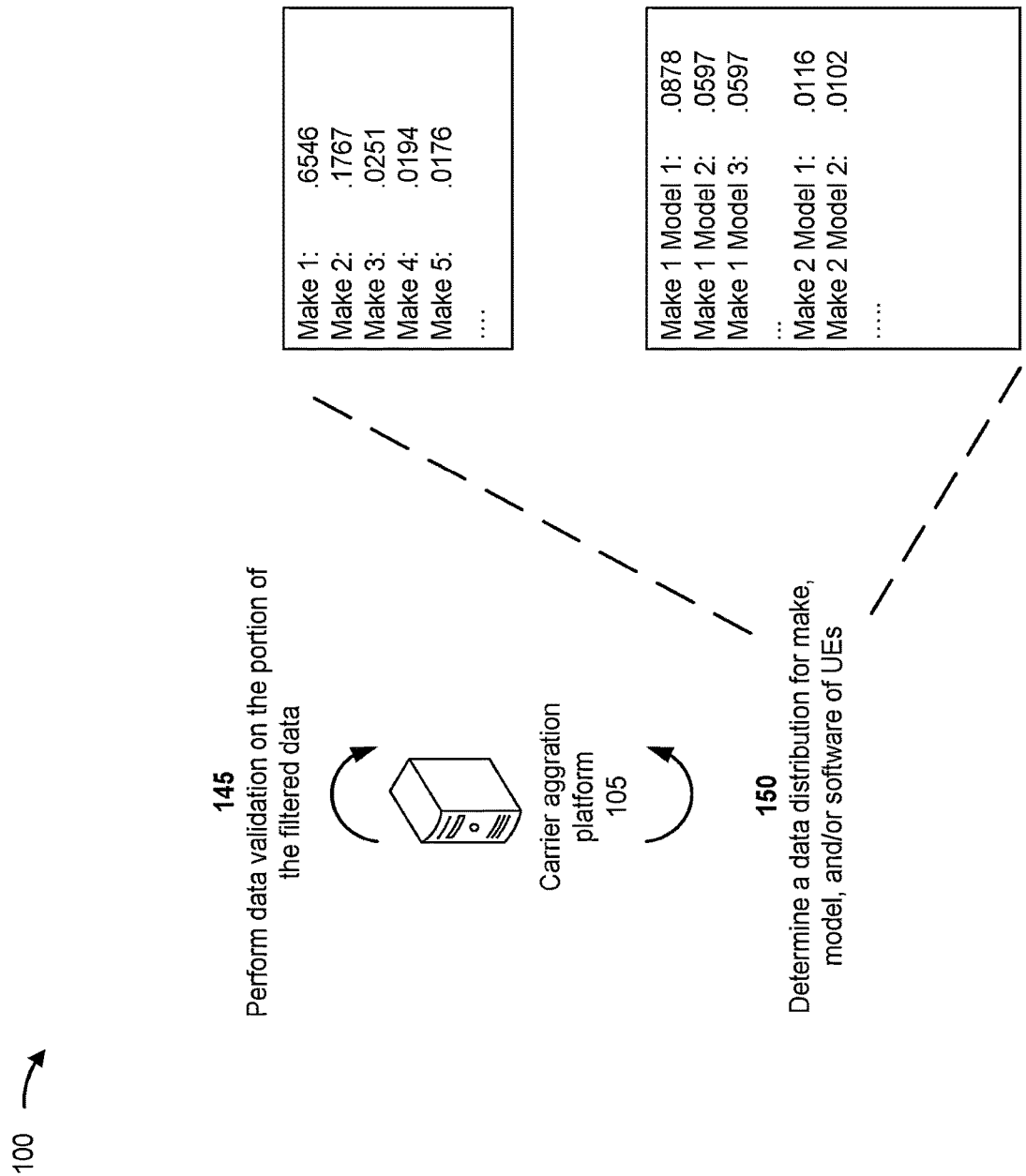

SYSTEMS AND METHODS FOR CARRIER AGGREGATION COMBINATION USING DEVICE DATA AND NETWORK DATA

BACKGROUND

A base station is a hardware component that connects a core network to an end user mobile device (e.g., a user equipment (UE)). In some instances, the base station may enable carrier aggregation. For example, multiple component carriers may be used for data transmission to the UE. For example, the carrier aggregation may improve throughput and/or latency experienced by the UE.

BRIEF DESCRIPTION OF THE DRAWINGS

FIGS. 1A-1G are diagrams of an example associated with carrier aggregation combination using device data and network data.

DETAILED DESCRIPTION OF PREFERRED EMBODIMENTS

Figure 1A:
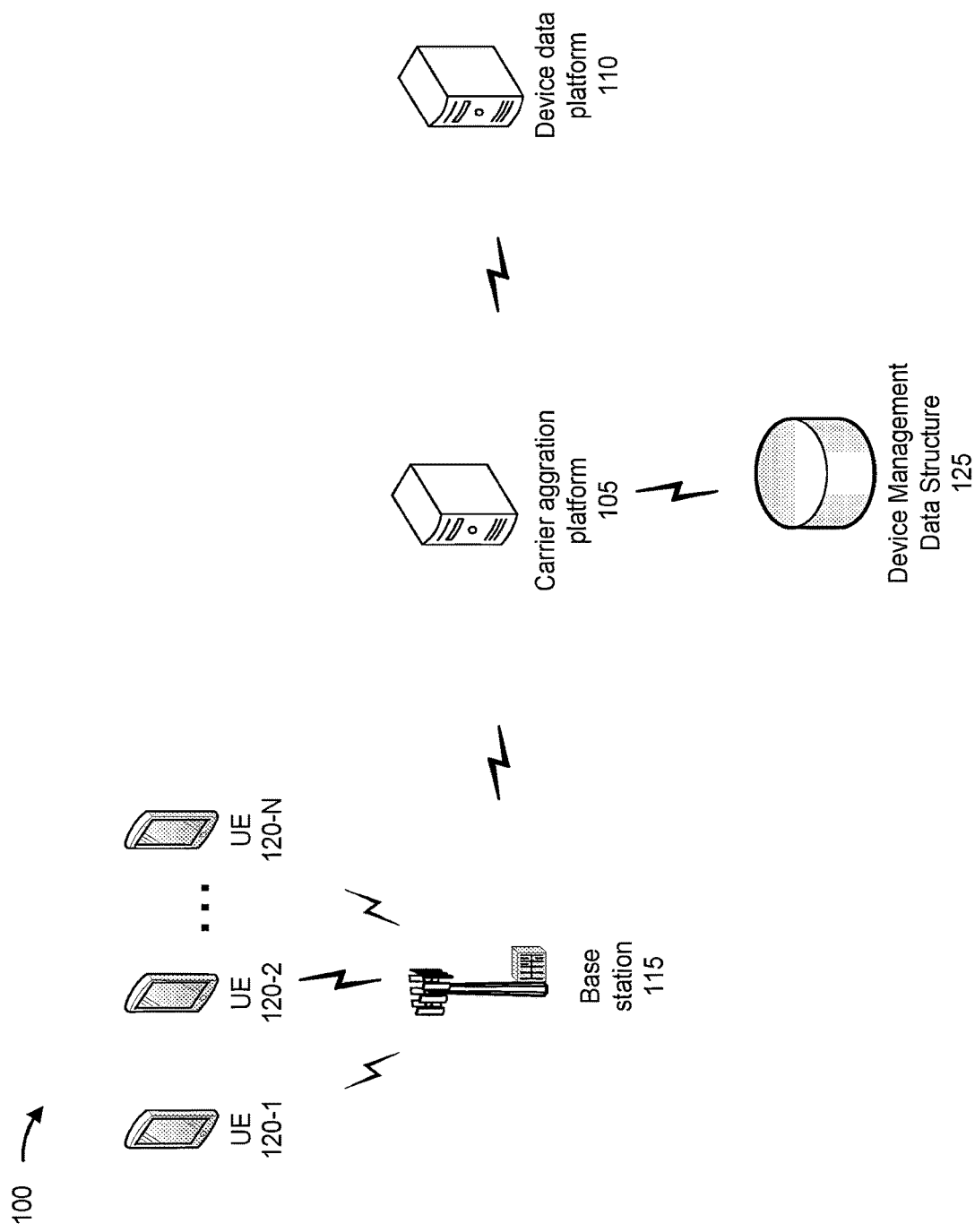

The following detailed description of example implementations refers to the accompanying drawings. The same reference numbers in different drawings may identify the same or similar elements.

Network configurations for carrier aggregation are typically generalized for large geographical areas. Currently a priority for connecting to a component carrier is mainly based on bandwidth of the component carrier without much regard to the load of the component carrier and/or a frequency band of the component carrier, or the capabilities of the user equipment (UEs) being served. As a result, component carriers of a cell site may be used inefficiently.

For example, a first component carrier, of the cell site, may be used more than a second component carrier of the cell site. Accordingly, the first component carrier may become overloaded while the second component carrier is underutilized, thereby preventing spectral efficiency. As a result of the first component carrier becoming overloaded, throughput of UEs utilizing the first component may be reduced.

Implementations described herein are directed to determining carrier aggregation configuration for UEs in a geographical area to improve throughput for the UEs. For example, the carrier aggregation configuration may be determined based on carrier aggregation capabilities of the UEs and capabilities of a network associated with the geographical area (e.g., a localized geographic area).

In some situations, the carrier aggregation capabilities may be determined based on a data distribution of the UEs. The data distribution of the UEs may be determined based on device data of the UEs (e.g., identified based on per call measurement data (PCMD) of the UEs). The data distribution of the UEs may identify makes, models, and/or software of the UEs. The data distribution of the UEs may be analyzed to identify combinations of makes and models of a portion of the UEs. As an example, the portion of the UEs may correspond to a top percentage of the UEs (e.g., top 90% of the UEs, or top 95% of the UEs, among other examples).

In some examples, the carrier aggregation capabilities of the UEs may be identified based on software associated with the combinations of makes and models of the UEs. Alternatively, the carrier aggregation capabilities of the UEs may be identified based on layer 3 data of the UEs.

In some examples, the carrier aggregation capabilities may identify component carriers that are supported by the UEs. The component carriers may include a primary component carrier and one or more secondary component carriers. The component carriers may be identified by frequency bands and/or a number of downlinks and/or uplink layers (associated with the frequency bands) that are supported by the UEs. The frequency bands supported by the UEs may be referred to as "UE component carriers." Multiple combinations of UE component carriers may be identified for a majority of the UEs (e.g., identified based on the carrier aggregation capabilities of the majority of the UEs).

The multiple combinations of UE component carriers may be combinations of UE component carriers that are supported by the majority of the UEs. In other words, the multiple combinations of UE component carriers may be based on a combination of carrier aggregation capabilities associated with different software of different makes and models of the UEs. The combination of carrier aggregation capabilities with different software may be referred to as "carrier aggregation combination."

The capabilities of the network may include carrier aggregation capabilities of a base station of the network. The carrier aggregation capabilities of the base station may identify component carriers that are available for the base station. The component carriers may be identified by frequency bands, bandwidths associated with the frequency bands, a number of antennas for transmitting data associated with the frequency bands, and/or a number of antennas for receiving data associated with the frequency bands, among other examples. The frequency bands supported by the base station may be referred to as "base station frequency bands."

Carrier aggregation information may be determined for UEs associated with the geographical area. The carrier aggregation information may identify combinations of the base station frequency bands, priorities associated with the combinations of the base station frequency bands, bandwidths associated with the combinations of the base station frequency bands, the number of antennas for transmitting data, and the number of antennas for receiving data. The combination of the base station frequency bands of the base station may be identified to support a majority of the multiple combinations of the UE component carriers.

The carrier aggregation information may be used to configure UEs associated with the geographical area. Configuring the UEs in this manner may prevent a component carrier from being overloaded. Accordingly, configuring the UEs in this manner improves spectral efficiency. Additionally, or alternatively, configuring the UEs in this manner benefits a majority of UEs of the geographical area. Accordingly, configuring the UEs in this manner may maximize throughput of the UEs in the geographical area.

Implementations described herein may be iterated to continuously update the carrier aggregation information (e.g., continuously update a manner in which the UEs and/or the base station are configured with respect to carrier aggregation). For example, implementations described herein enable ongoing optimization of parameters of the base station to configure carrier aggregation combinations that continuously provide the best user experience for a majority of UEs in the geographical area.

The carrier aggregation information may be updated based on updates to the network. The updates to the network may be based on UEs of additional makes and models being introduced in the network, a new spectrum being introduced in the network, changes to key performance indicators (KPIs) of the network, changes to an amount of traffic or a traffic pattern in the network, and/or changes to an amount of data consumption in the network. The KPIs may be related to throughput, dropped calls, or number of connected UEs, among other examples.

FIGS. 1A-1G are diagrams of an example 100 associated with carrier aggregation combination using device data and network data. As shown in FIGS. 1A-1G, example 100 includes a carrier aggregation platform 105, a device data platform 110, a base station 115 of a network, a UE 120-1 to a UE 120-N (individually "UE 120" and collectively "UEs 120"), and a device management data structure 125. Carrier aggregation platform 105 may include one or more devices capable of receiving, generating, storing, processing, and/or providing information associated with configuring carrier aggregation combinations for base station 115 and/or UEs 120. For example, carrier aggregation platform 105 may be configured to determine carrier aggregation combination based on device data of a plurality of UEs and based on network data of base station 115.

Device data platform 110 may include one or more devices capable of receiving, generating, storing, processing, and/or providing device data regarding a plurality of UEs, such as UEs 120. In some implementations, the device data may include layer 3 data regarding the UEs. For example, the device data may include PCMD of the UEs. In some instances, the layer 3 data (e.g., the PCMD) may include information regarding carrier aggregation capabilities of the UEs. As an example, the carrier aggregation capabilities of a UE may include a frequency band of a primary component carrier, a number of downlinks and/or uplink layers for the frequency band, one or more frequency bands for one or more secondary component carriers, and a number of downlinks and/or uplink layers for each of the one or more frequency bands.

In some examples, base station 115 may include a base station of a fourth generation (4G) long term evolution (LTE) wireless network. For example, base station 115 may be an eNodeB in an LTE wireless network. Alternatively, base station 115 may include a base station of a fifth generation (5G) wireless network. For example, base station 115 may be a gNodeB in a 5G wireless network.

A UE 120 may include one or more devices capable of receiving, generating, storing, processing, and/or providing information associated with carrier aggregation combination, as described elsewhere herein. UE 120 may include a communication device and a computing device. For example, UE 120 may include a wireless communication device, a mobile phone, or a similar type of device.

Device management data structure 125 may include a data structure (e.g., a database, a table, and/or a linked list) that stores information regarding software implemented on UEs in association with carrier aggregation capabilities of the UEs. For example, device management data structure 125 may store a first combination of make and model in association with first software and first carrier aggregation capabilities of the first software, store a second combination of make and model in association with second software and second carrier aggregation capabilities of the second software, and so on.

Figure 1B:
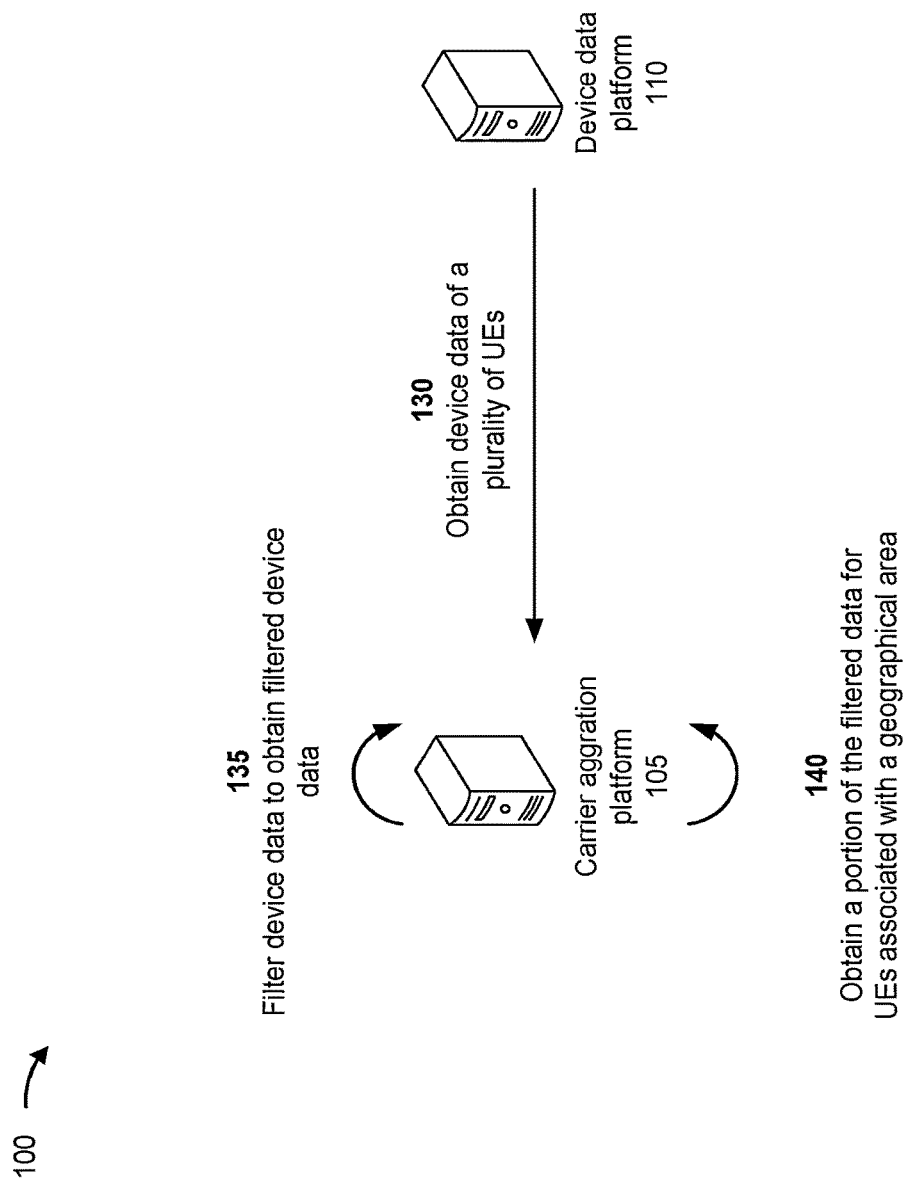

As shown in FIG. 1B, and by reference number 130, carrier aggregation platform 105 may obtain device data of a plurality of UEs. The device data may include layer 3 data of the plurality of UEs. For example, the device data may include PCMD of the plurality of UEs. In some implementations, the device data of a UE may identify a make and model combination of the UE. Additionally, the device data of the UE may identify carrier aggregation capabilities of the UE. While the example described herein refers to UEs, the example described herein is applicable to other types of devices, such as Internet of Things (IOT) devices.

In some examples, carrier aggregation platform 105 may obtain the device data based on an aggregation update request from a network administrator. The aggregation update request may be a request to configure carrier aggregation combinations for devices associated with a geographical area in order to improve throughput and/or spectral efficiency in the geographical area. In some situations, based on the aggregation update request, carrier aggregation platform 105 may provide a device data request to device management data structure 125. Carrier aggregation platform 105 may receive the device data based on providing the device data request.

In some situations, the device data request may include information identifying the geographical area. In this regard, the device data may include data regarding UEs associated with the geographical area (e.g., UEs located in the geographical area, UEs that are connected to base stations in the geographical area, among other examples). In some situations, the device data request may not include information identifying the geographical area. In this regard, the device data may include data regarding UEs associated with a plurality of geographical areas.

As shown in FIG. 1B, and by reference number 135, carrier aggregation platform 105 may filter device data to obtain filtered device data. In some implementations, carrier aggregation platform 105 may filter the device data based on an amount of data. For example, carrier aggregation platform 105 may filter the PCMD regarding the plurality of UEs based on an amount of data included in the PCMD of each UE of the plurality of UEs. The amount of data may be a minimum number of kilobytes, or a minimum number of megabytes, among other examples. The amount of data may be used to identify UEs that generate an amount of network traffic in the network that satisfies an amount threshold. The amount of data and/or the amount threshold may be determined by the network administrator, may be determined based on historical amounts of data analyzed, and/or may be determined based on historical amount thresholds. Additionally, or alternatively, to filtering based on the amount of data, the PCMD may be filtered based on a number of connections in a given period of time and/or a duration of sessions.

As shown in FIG. 1B, and by reference number 140, carrier aggregation platform 105 may obtain a portion of the filtered data for UEs associated with the geographical area. In some implementations, if the filtered data includes the data regarding UEs associated with a plurality of geographical areas, carrier aggregation platform 105 may obtain the portion of the filtered data for the UEs associated with the geographical area.

In some examples, the geographical area may be determined by the network administrator. The geographical area may be an area in which throughput (of UEs) is not satisfying a throughput threshold. Additionally, or alternatively, the geographical area may be an area in which spectral efficiency is not satisfying an efficiency threshold.

In this regard, the geographical area may be determined based on needs (e.g., business needs) regarding throughput and/or spectral efficiency.

As shown in FIG. 1C, and by reference number 145, carrier aggregation platform 105 may perform data validation on the portion of the filtered data. In some situations, the portion of the filtered data may include information identifying different variations of different UE make and model combinations. In this regard, carrier aggregation platform 105 may perform the data validation to identify the different variations of the information identifying the different make and model combinations and consolidate the information identifying each make and model combination. Performing the data validation may prevent a single UE make and model combination from being perceived as multiple UE make and model combinations, thereby preventing discrepancies relating to determining a data distribution of make and model combinations.

As shown in FIG. 1C, and by reference number 150, carrier aggregation platform 105 may determine a data distribution for make, model, and/or software of UEs. In some implementations, after performing the data validation, carrier aggregation platform 105 may analyze the portion of the filtered data to determine the data distribution of make, model, and/or software of the UEs. For example, carrier aggregation platform 105 may determine a data distribution of makes. For instance, carrier aggregation platform 105 may determine a first portion of the UEs that are of a first make, a second portion of the UEs that are of a second make, and so on. As shown in FIG. 1C, as an example, carrier aggregation platform 105 may determine that 65.46% of the UEs are of the first make (Make 1), that 17.67% of the UEs are of the second make (Make 2), and so on.

Additionally, or alternatively, to determining the data distribution of makes, carrier aggregation platform 105 may determine a data distribution of make and model combinations. For example, carrier aggregation platform 105 may determine a third portion of the UEs that are of a first make and model combination, a fourth portion of the UEs that are of a second make and model combination, and so on. As shown in FIG. 1C, as an example, carrier aggregation platform 105 may determine that 8.78% of the UEs are of the first make and model combination (Make 1 Model 1), that 5.97% of the UEs are of the second make and model combination (Make 1 Model 2), and so on.

Figure 1D:
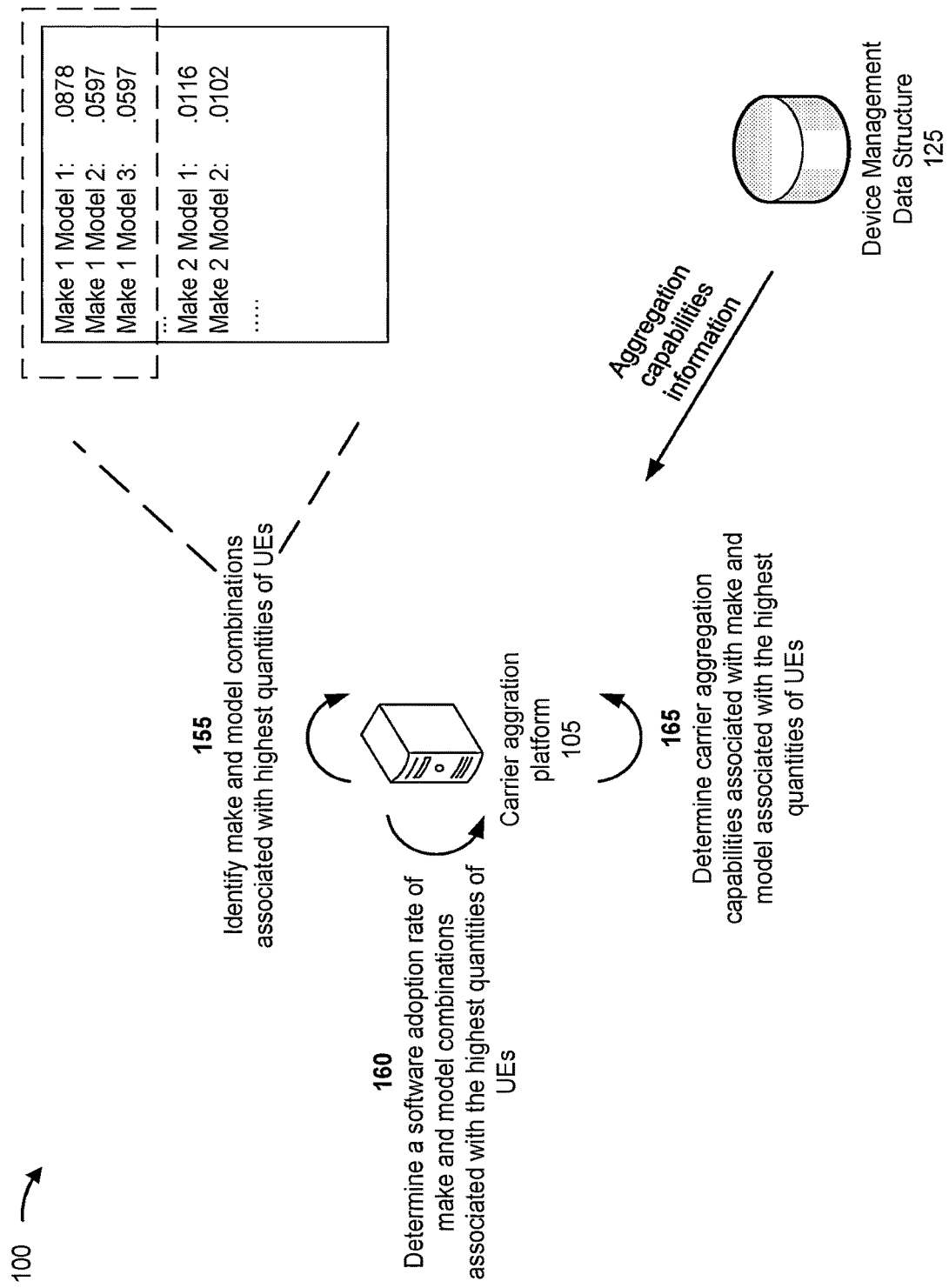

As shown in FIG. 1D, and by reference number 155, carrier aggregation platform 105 may identify make and model combinations associated with highest quantities of UEs. For example, carrier aggregation platform 105 may analyze the data distribution of make and model combinations to identify make and model combinations associated with the highest quantities of UEs (e.g., the highest three quantities of UEs, the highest five quantities of UEs, among other examples). In some situations, the highest quantities of UEs may be identified such that a total quantity of UEs (from the highest quantities of UEs) satisfies a quantity threshold. The quantity threshold may be identified by the network administrator and/or identified based on historical quantity thresholds. In some situations, the quantity threshold may be determined such that the total quantity of UEs corresponds to a majority of UEs (e.g., top 95% of the UEs or top 90% of the UEs, among other examples).

As shown in FIG. 1D, and by reference number 160, carrier aggregation platform 105 may determine a software adoption rate of make and model combinations associated with the highest quantity of UEs. In some implementations, carrier aggregation platform 105 may determine software associated with each make and model combination of the make and model combinations associated with the highest quantity of UEs and determine an adoption rate of the software.

For example, carrier aggregation platform 105 may obtain adoption information regarding the software associated with a make and model combination. The adoption information may be obtained from one or more devices in the network. The adoption information may identify the software (or a current version of the software) and may indicate whether an adoption rate of the software satisfies an adoption rate threshold. For example, the adoption information may indicate a portion of UEs, of the make and model combinations, on which the software is implemented (or installed). Carrier aggregation platform 105 may determine whether the adoption rate of the software satisfies the adoption rate threshold by determining whether the portion of UEs satisfies a portion threshold.

As an example, the portion threshold (and accordingly the adoption rate threshold) may be 95%, 90%, or 85%, among other examples. The adoption rate threshold and/or the portion threshold may be determined by the network administrator and/or by historical thresholds. The portion threshold may be a value indicating that the software has been implemented on a majority of UEs of the make and model combinations. Carrier aggregation platform 105 may perform similar actions for other make and model combinations.

As shown in FIG. 1D, and by reference number 165, carrier aggregation platform 105 may determine carrier aggregation capabilities associated with make and model combinations associated with the highest quantities of UEs. In some implementations, based on determining that the adoption rate satisfies the adoption rate threshold, carrier aggregation platform 105 may obtain aggregation capabilities information identifying carrier aggregation capabilities of software associated with the make and model combinations associated with the highest quantities of UEs.

Carrier aggregation platform 105 may obtain the aggregation capabilities information from device management data structure 125. For example, carrier aggregation platform 105 may perform one or more lookups of device management data structure 125 using information identifying each make and model combination. Based on the one or more lookups, carrier aggregation platform 105 may obtain the aggregation capabilities information identifying the carrier aggregation capabilities of the software associated with the make and model combinations.

As an example, the carrier aggregation capabilities of software associated with the first make and model combination may identify component carriers that are supported by UE s of the first make and model combination. The component carriers may include a primary component carrier and one or more secondary component carriers. The component carriers may be identified by UE component carriers supported by the UEs and/or a number of downlinks and/or uplink layers associated with the UE frequency.

Figure 1E:
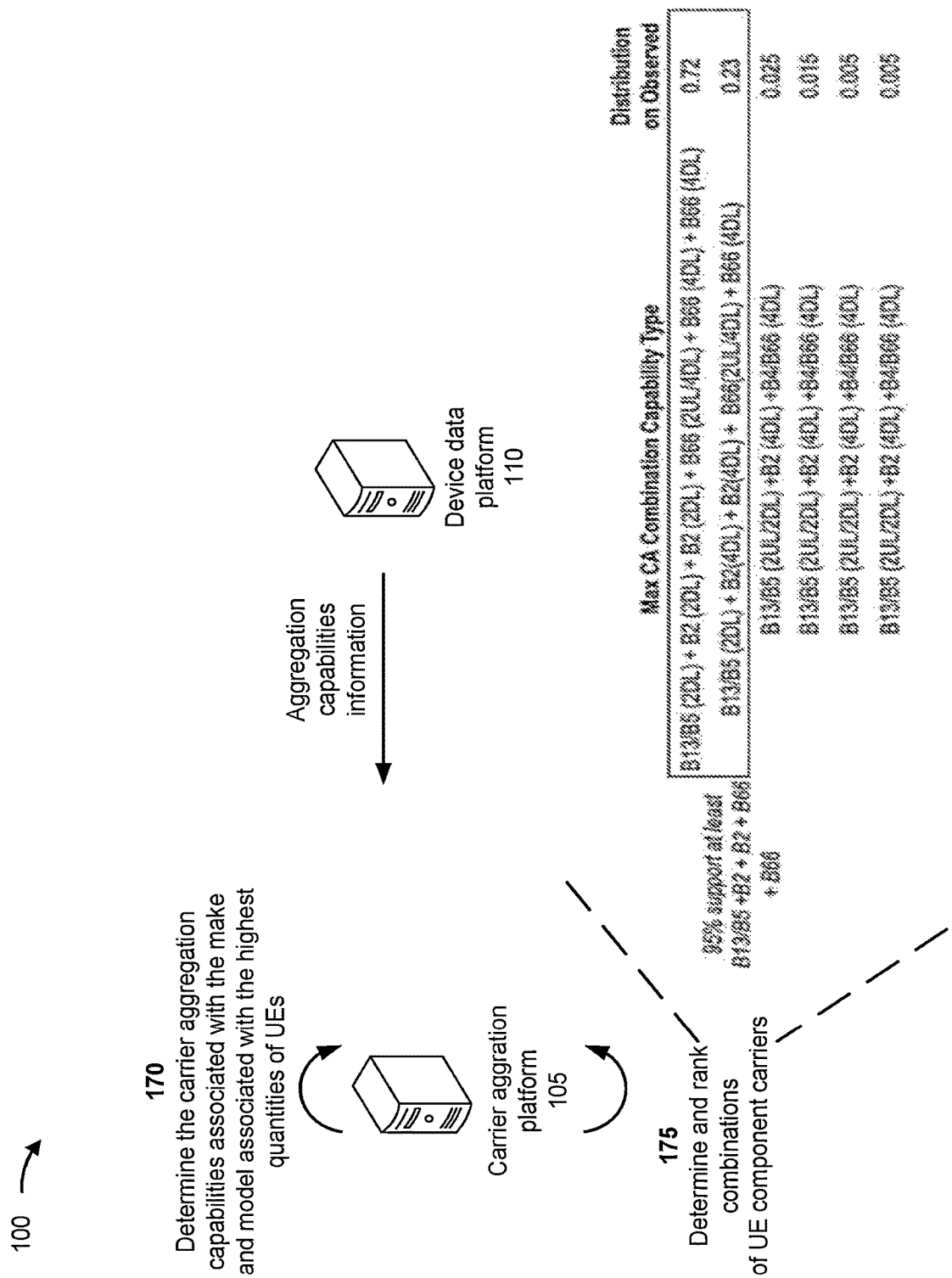

As shown in FIG. 1E, and by reference number 170, carrier aggregation platform 105 may determine the carrier aggregation capabilities associated with the make and model combinations associated with the highest quantities of UEs. In some implementations, based on determining that the adoption rate does not satisfy the adoption rate threshold, carrier aggregation platform 105 may obtain the aggregation capabilities information from the layer 3 data regarding the UEs. As explained herein, the layer 3 data may include PCMD of the UEs. In some examples, the layer 3 data of a UE may include information identifying a make and model combination of the UE, software installed on the UE, and/or the carrier aggregation capabilities associated with the software.

As shown in FIG. 1E, as an example, carrier aggregation platform 105 may obtain the layer 3 data from device data platform 110. As an example, carrier aggregation platform 105 may provide a request including information identifying the make and model combinations associated with the highest quantities of UEs. Based on the request, carrier aggregation platform 105 may obtain the layer 3 data and analyze the layer 3 data to determine the aggregation capabilities information.

As shown in FIG. 1E, and by reference number 175, carrier aggregation platform 105 may determine and rank combinations of UE component carriers. For example, carrier aggregation platform 105 may analyze the aggregation capabilities information (obtained from device management data structure 125 or from device data platform 110) to determine the combinations of the UE component carriers. The UE component carriers may be selected from the UE component carriers identified for the software associated with each of the make and model combinations. Carrier aggregation platform 105 may determine different permutations of combinations of the UE component carriers that are supported by different portions of the UEs.

As shown in FIG. 1E, for example, carrier aggregation platform 105 may determine a first combination of the UE component carriers that is supported by 72% of the UEs, a second combination of the UE component carriers that is supported by 23% of the UEs, a third combination of the UE component carriers that is supported by 2.5% of the UEs, and so on. In some situations, carrier aggregation platform 105 may determine the different combinations of the UE component carriers based on information identifying allowed combinations of frequency bands and identifying a maximum combination of frequency bands, bandwidths and downlink/uplink transmission layers.

In some implementations, carrier aggregation platform 105 may rank the combinations of the UE component carriers. For example, carrier aggregation platform 105 may rank the combinations of the UE component carriers in an order that is based on the portions of the UEs that support the combinations of the UE component carriers. For instance, the first combination of the UE component carriers that is supported by a highest portion of the UEs may be ranked first, followed by the second combination of the UE component carriers that is supported by a second highest portion of the UEs, and so on. Carrier aggregation platform 105 may rank the combinations of the UE component carriers to maximize throughput for the UEs of the make and model combinations associated with the highest quantities of UEs.

Figure 1F:
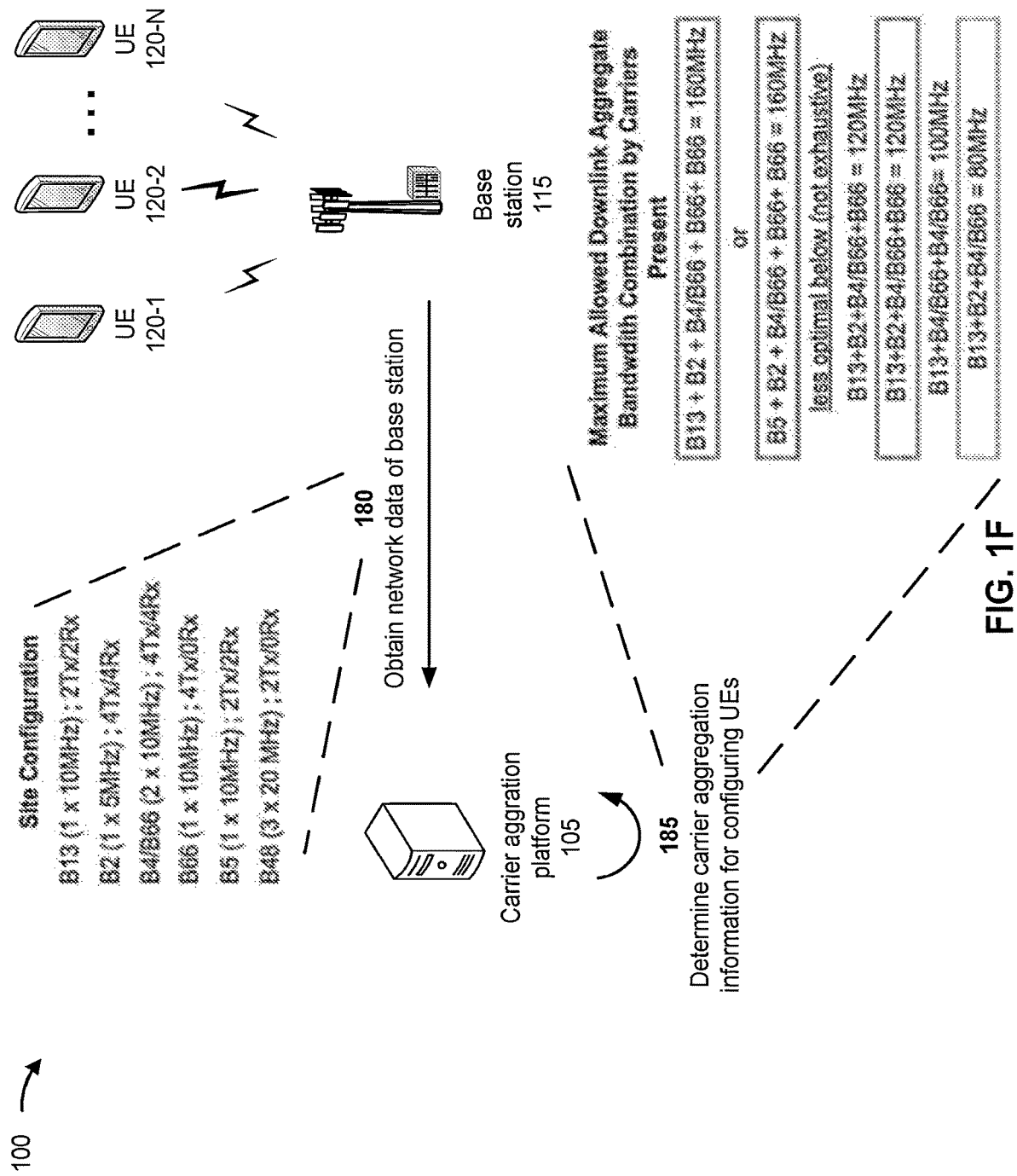

As shown in FIG. 1F, and by reference number 180, carrier aggregation platform 105 may obtain network data of base station 115. For example, carrier aggregation platform 105 may obtain network data of base station 115 and/or one or more other base stations that are included in the geographical area. Carrier aggregation platform 105 may identify base station 115 and/or the one or more other base stations in an effort to improve throughput and improve spectral efficiency in the geographical area. In some examples, the network data of base station 115 may identify the carrier aggregation capabilities of base station 115.

The carrier aggregation capabilities of base station 115 may identify component carriers that are available via base station 115. The component carriers may be identified by base station frequency bands, bandwidths associated with the base station frequency bands, a number of antennas for transmitting data associated with the base station frequency bands, a number of antennas for receiving data associated with the base station frequency bands, and/or bandwidths associated with each of the base station frequency bands.

As shown in FIG. 1F, and by reference number 185, carrier aggregation platform 105 may determine carrier aggregation information for configuring UEs. For example, carrier aggregation platform 105 may compare the base station frequency bands and the combinations of the UE component carriers to identify different combinations of the base station frequency bands that would be supported by a majority of the UEs. The UE component carriers correspond to frequency bands observed in the immediate geographical area of base station 115.

As an example, carrier aggregation platform 105 may identify a first optimal combination of base station frequency bands based on the UE component carriers included in the first combination of the UE component carriers. In some situations, the base station frequency bands (of the first optimal combination of frequency bands) may include one or more UE component carriers of the first combination of the UE component carriers.

In some situations, carrier aggregation platform 105 may determine equivalent choices of optimal combinations of base station frequency bands for a combination of the UE component carriers. As shown in FIG. 1F, for example, carrier aggregation platform 105 may identify a first combination of base station frequency bands and identify a second combination of base station frequency bands for the first combination of the UE component carriers. As further shown in FIG. 1F, a difference between the two combinations may be the primary component carrier (e.g., B13 and B5). In such an instance, the network administrator may determine the primary component carrier (e.g., B13 or B5).

Carrier aggregation platform 105 may assign a priority to each combination of base station frequency bands. In some examples, a priority may be based on a portion of the UEs that support a combination of base station frequency bands to which the priority is assigned. As an example, the first combination of base station frequency bands (that includes the primary component carrier) may be assigned a first priority, the second combination of base station frequency bands may be assigned a second priority, a third combination of base station frequency bands (associated with the second combination of the UE component carriers) may be assigned a third priority, and so on.

Figure 1G:
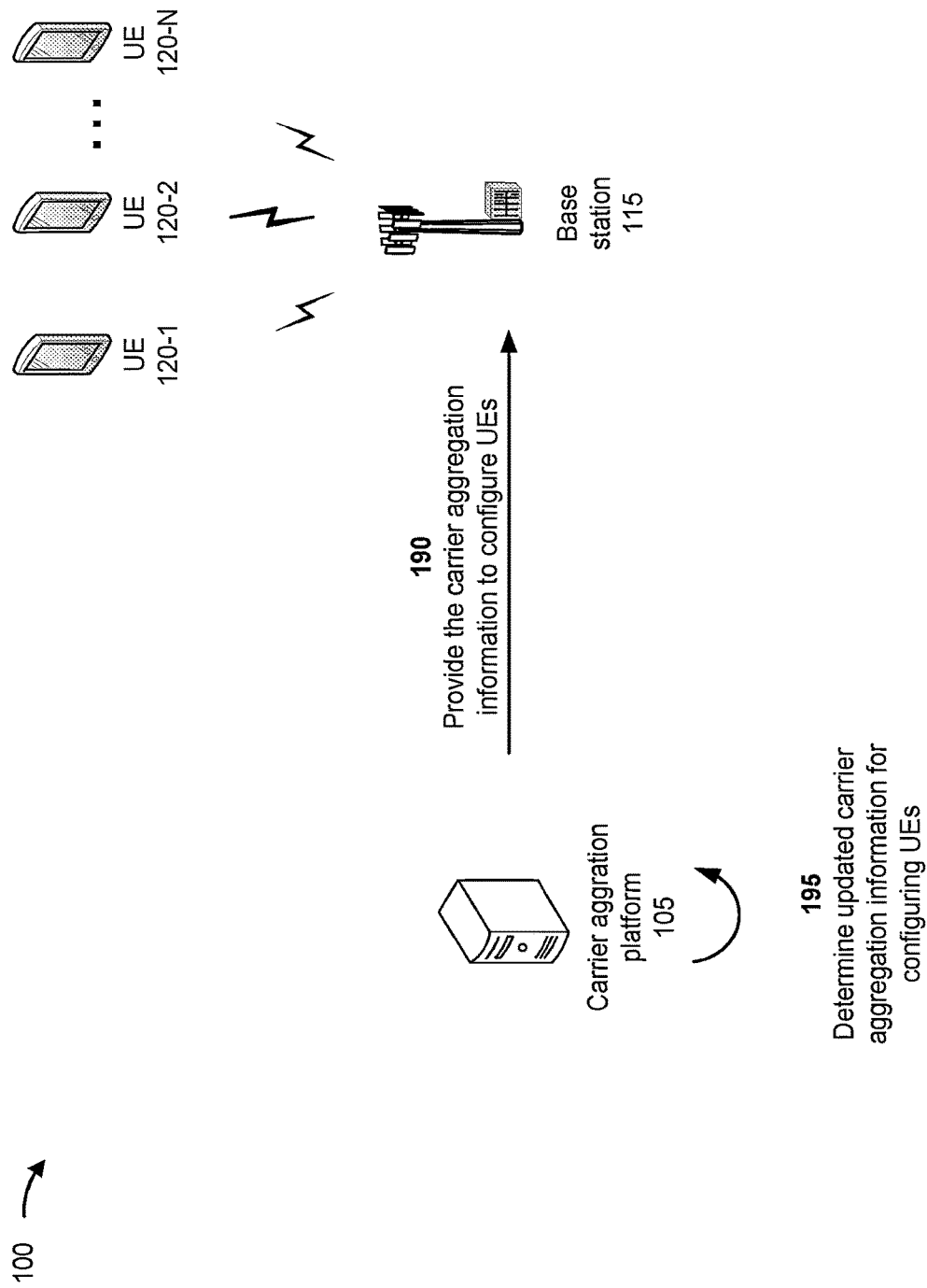

As shown in FIG. 1G, and by reference number 190, carrier aggregation platform 105 may provide carrier aggregation information to configure UEs. For example, carrier aggregation platform 105 may provide the carrier aggregation information to base station 115 to cause base station 115 to provide the carrier aggregation information to UEs associated with base station 115. Base station 115 may provide the carrier aggregation information to the UEs to cause the UEs to be configured in accordance with the carrier aggregation information. For example, the UEs may be configured to utilize the different combinations of base station frequency bands in accordance with the priorities associated with the different combinations of base station frequency bands.

As shown in FIG. 1G, and by reference number 195, carrier aggregation platform 105 may determine updated carrier aggregation information for configuring UEs. For example, carrier aggregation platform 105 may iterate the actions described herein to continuously update the carrier aggregation information (e.g., continuously update a manner in which the UEs and/or base station 115 are configured with respect to carrier aggregation). For example, carrier aggregation platform 105 may update the carrier aggregation information based on updates to the network. The updates to the network may be based on UEs of additional make and model combinations being introduced in the network, a new spectrum being obtained and introduced in the network, changes to KPIs associated with the network, changes to an amount of traffic in the network, and/or changes to an amount of data consumption in the network. In other words, the carrier aggregation information may be updated based on upgraded solutions for UEs, and/or based on upgraded configuration capabilities for UEs with respect to carrier aggregation, among other examples.

Configuring the UEs in this manner may prevent a component carrier from being overloaded. Accordingly, configuring the UEs in this manner improves spectral efficiency. Additionally, or alternatively, configuring the UEs in this manner benefits a majority of UEs of the geographical area. Accordingly, configuring the UEs in this manner may maximize throughput of the UEs in the geographical area.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
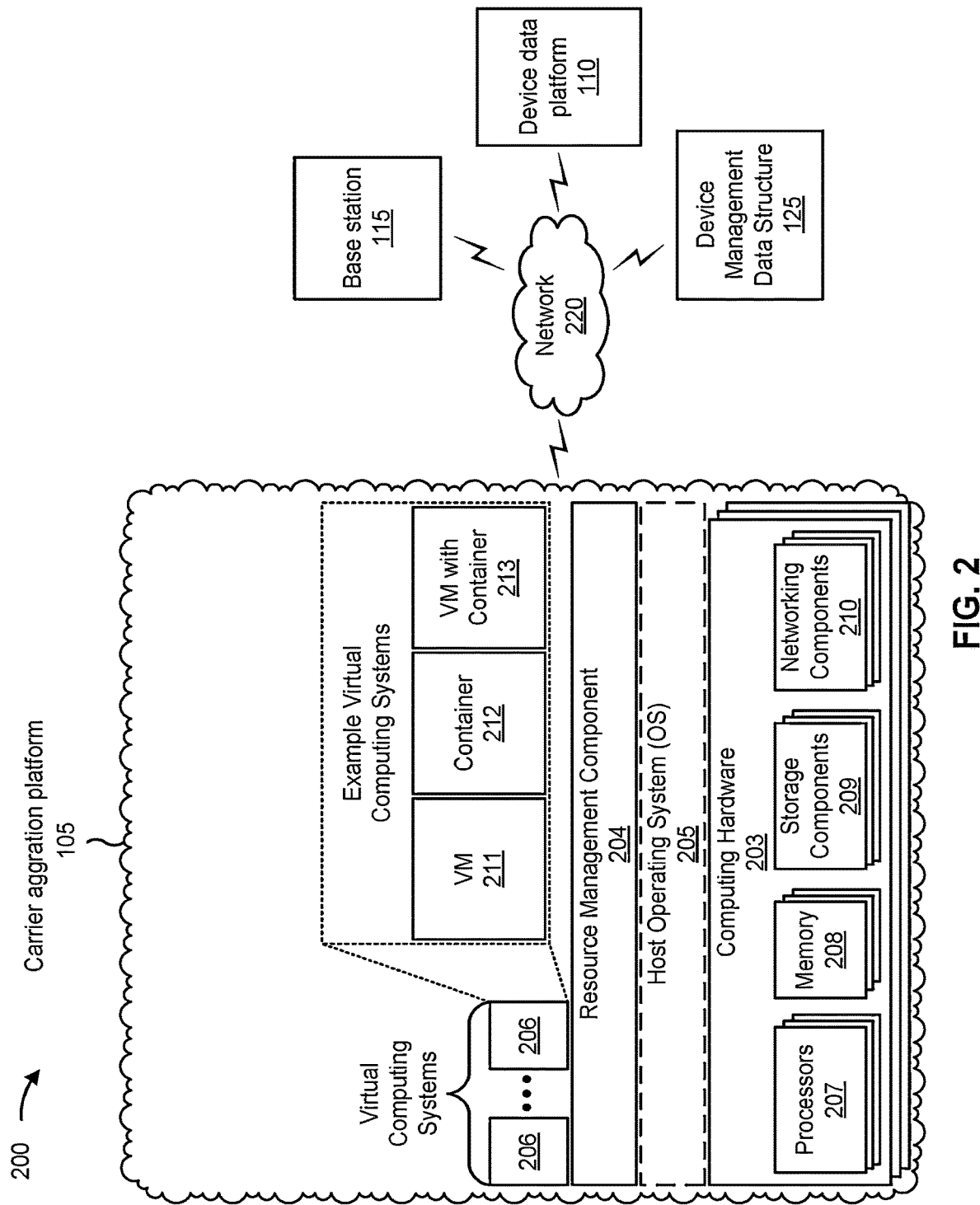
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a carrier aggregation platform 105, which may include one or more elements of and/or may execute within a cloud computing system 202. The cloud computing system 202 may include one or more elements 203-213, as described in more detail below. As further shown in FIG. 2, environment 200 may include a network 220, device data platform 110, base station 115, and/or device management data structure 125. Device data platform 110, base station 115, and/or device management data structure 125 have been described above in connection with FIG. 1. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualization of computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although carrier aggregation platform 105 may include one or more elements 203-213 of the cloud computing system 202, may execute within the cloud computing system 202, and/or may be hosted within the cloud computing system 202, in some implementations, carrier aggregation platform 105 may not be cloud-based (e.g., may be implemented outside of a cloud computing system) or may be partially cloud-based. For example, carrier aggregation platform 105 may include one or more devices that are not part of the cloud computing system 202, such as device 300 of FIG. 3, which may include a standalone server or another type of computing device. Carrier aggregation platform 105 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
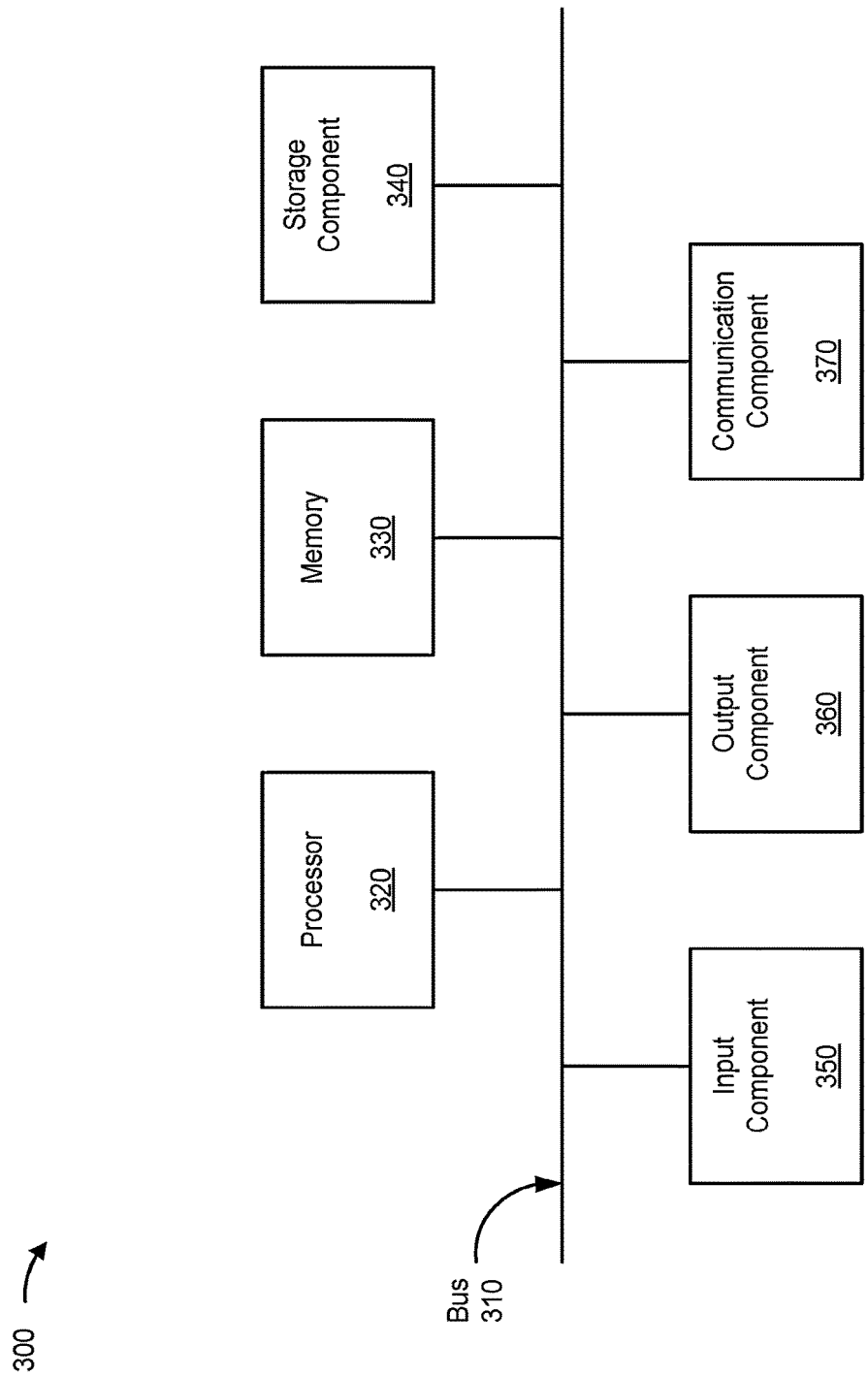
FIG. 3 is a diagram of example components of one or more devices of FIG. 2.

FIG. 3 is a diagram of example components of a device 300, which may correspond to carrier aggregation platform 105, device data platform 110, base station 115, and/or device management data structure 125. In some implementations, carrier aggregation platform 105, device data platform 110, base station 115, and/or device management data structure 125 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
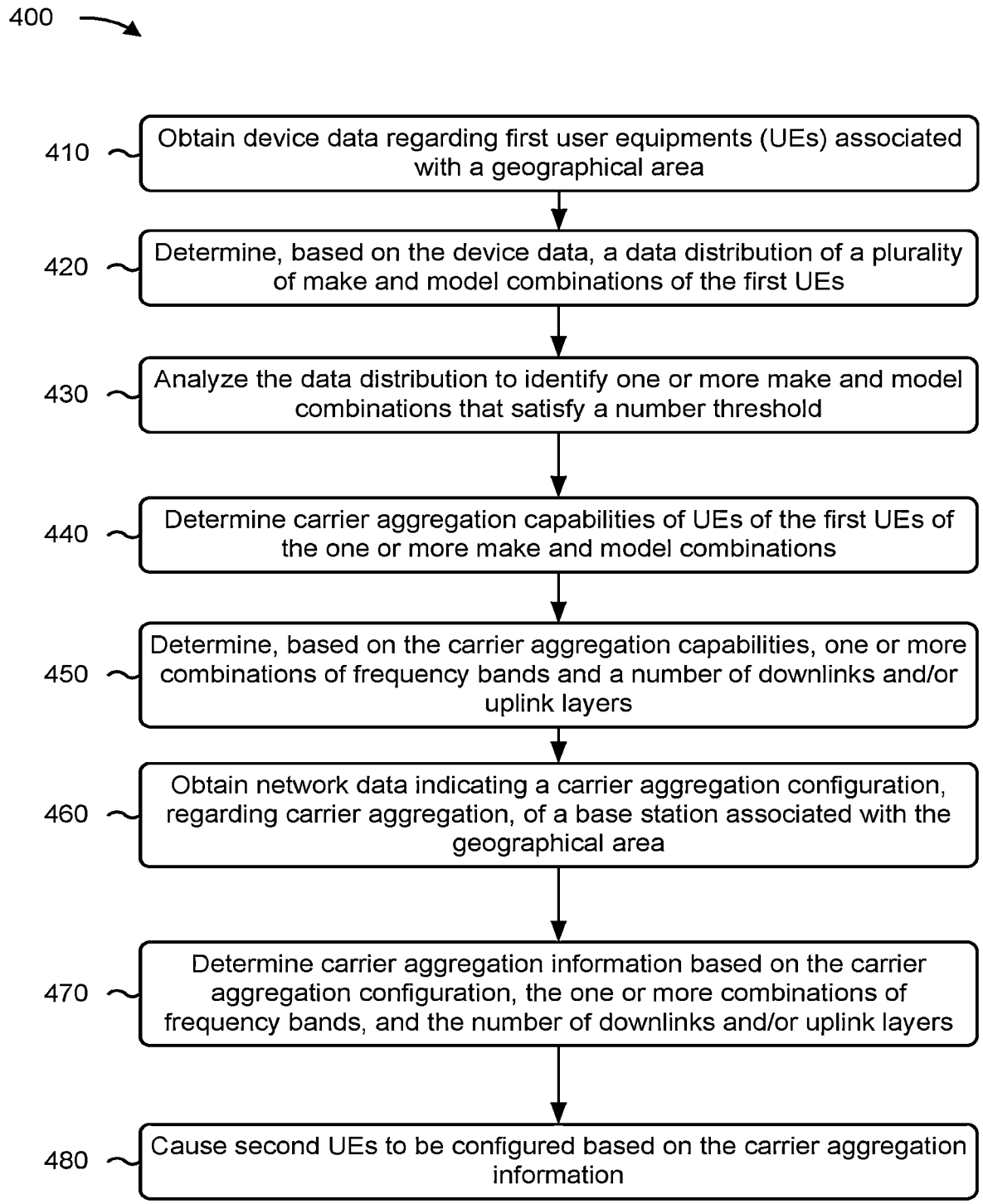
FIG. 4 is a flowchart of an example process relating to carrier aggregation combination using device data and network data.

FIG. 4 is a flowchart of an example process 400 relating to carrier aggregation combination using device data and network data. In some implementations, one or more process blocks of FIG. 4 may be performed by a carrier aggregation platform (e.g., carrier aggregation platform 105). In some implementations, one or more process blocks of FIG. 4 may be performed by another device or a group of devices separate from or including the carrier aggregation platform, such as a device data platform (e.g., device data platform 110), a base station (e.g., base station 115), and/or a device management data structure (e.g., device management data structure 125). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include obtaining device data regarding first UEs associated with a geographical area (block 410).

In some implementations, obtaining the device data comprises obtaining per call measurement data regarding one or more of the first UEs. Determining the carrier aggregation capabilities comprises determining carrier aggregation capabilities of the one or more of the first UEs based on the per call measurement data regarding the one or more of the first UEs.

As further shown in FIG. 4, process 400 may include determining, based on the device data, a data distribution of a plurality of make and model combinations of the first UEs (block 420).

As further shown in FIG. 4, process 400 may include analyzing the data distribution to identify one or more UE make and model combinations, of the plurality of make and model combinations, that satisfy a number threshold (block 430).

As further shown in FIG. 4, process 400 may include determining carrier aggregation capabilities, associated with carrier aggregation, of UEs of the first UEs of the one or more make and model combinations (block 440).

In some implementations, determining the carrier aggregation capabilities of the UEs of the one or more make and model combinations comprises determining software implemented on the UEs, and determining the carrier aggregation capabilities based on the software implemented on the UEs. The carrier aggregation capabilities identify frequency bands supported by the UEs and a number of downlinks and/or uplink layers for each frequency band.

As further shown in FIG. 4, process 400 may include determining, based on the carrier aggregation capabilities, one or more combinations of frequency bands, and a number of downlinks and/or uplink layers for each of the frequency bands (block 450).

As further shown in FIG. 4, process 400 may include obtaining network data indicating a carrier aggregation configuration, associated with carrier aggregation, of a base station associated with the geographical area (block 460).

In some implementations, obtaining the network data indicating the carrier aggregation configuration comprises obtaining information identifying one or more of different frequency bands associated with different carrier components, a number of antennas for transmitting data, a number of antennas for receiving data, or channeling bandwidths associated with the different frequency bands.

In some implementations, determining the carrier aggregation information comprises determining the carrier aggregation information based on the different frequency bands associated with different carrier components, the number of antennas for transmitting data, the number of antennas for receiving data, the one or more combinations of frequency bands.

As further shown in FIG. 4, process 400 may include determining carrier aggregation information based on the carrier aggregation configuration, the one or more combinations of frequency bands, and the number of downlinks and/or uplink layers (block 470). In some implementations, the carrier aggregation information identifies a first combination of frequency bands associated with a first priority and a second combination of frequency bands associated with a second priority.

As further shown in FIG. 4, process 400 may include causing second UEs to be configured based on the carrier aggregation information (block 480).

In some implementations, process 400 includes obtaining per call measurement data (PCMD) regarding a plurality of UEs, and filtering the PCMD regarding a plurality of UEs to obtain the device data regarding the first UEs. The PCMD is filtered based on one or more of an amount of data included in the PCMD of each UE of the plurality of UEs, a number of connections in a given period of time, or a duration of sessions.

In some implementations, process 400 includes ranking the one or more combinations of frequency bands. Determining the carrier aggregation information comprises determining the first combination of frequency bands associated with the first priority based on a first one of the ranked one or more combinations of frequency bands, and determining the second combination of frequency bands associated with the second priority based on a second one of the ranked one or more combinations of frequency bands.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a carrier aggregation platform, the method comprising:
obtaining device data regarding first user equipments (UEs) associated with a geographical area;

determining, based on the device data, a data distribution of a plurality of make and model combinations of the first UEs;

analyzing the data distribution to identify one or more make and model combinations, of the plurality of make and model combinations, that satisfy a number threshold;

determining carrier aggregation capabilities, associated with carrier aggregation, of UEs of the first UEs of the one or more make and model combinations;

determining one or more combinations of frequency bands and a number of downlinks and/or uplink layers for each of the frequency bands,
 wherein the one or more combinations of frequency bands and the number of downlinks and/or uplink layers are determined based on the carrier aggregation capabilities;

obtaining network data indicating a carrier aggregation configuration of a base station associated with the geographical area;

determining carrier aggregation information based on the carrier aggregation configuration, the one or more combinations of frequency bands, and the number of downlinks and/or uplink layers,
 wherein the carrier aggregation information identifies a first combination of frequency bands associated with a first priority and a second combination of frequency bands associated with a second priority; and causing second UEs to be configured based on the carrier aggregation information.

2. The method of claim 1, further comprising:

obtaining per call measurement data (PCMD) regarding a plurality of UEs; and filtering the PCMD regarding the plurality of UEs to obtain the device data regarding the first UEs,
 wherein the PCMD is filtered based on one or more of an amount of data included in the PCMD of each UE of the plurality of UEs, a number of connections in a given period of time, or a duration of sessions.

3. The method of claim 2, wherein the amount of data satisfies an amount threshold, and wherein one or more of the amount of data and the amount threshold are determined by one of: a network administrator, historical amounts of data analyzed, and historical amount thresholds.

4. The method of claim 1, wherein determining the carrier aggregation capabilities comprises:

determining software implemented on the UEs; and determining the carrier aggregation capabilities based on the software implemented on the UEs,
 wherein the carrier aggregation capabilities identify frequency bands supported by the UEs and a number of downlinks and/or uplink layers for each frequency band.

5. The method of claim 1, wherein obtaining the network data indicating the carrier aggregation configuration comprises:

obtaining information identifying one or more of:
 different frequency bands associated with different carrier components,
 a number of antennas for transmitting data,
 a number of antennas for receiving data, or
 channel bandwidths associated with the different frequency bands.

6. The method of claim 5, wherein determining the carrier aggregation information comprises:

determining the carrier aggregation information based on the different frequency bands associated with different carrier components, the number of antennas for transmitting data, the number of antennas for receiving data, the one or more combinations of frequency bands.

7. The method of claim 1, further comprising:

ranking the one or more combinations of frequency bands; and wherein determining the carrier aggregation information comprises:
 determining a plurality of combinations of frequency bands, each combination being associated with a different priority.

8. The method of claim 1, wherein obtaining the device data comprises:

obtaining per call measurement data regarding one or more of the first UEs; and wherein determining the carrier aggregation capabilities comprises:

determining carrier aggregation capabilities of the one or more of the first UEs based on the per call measurement data regarding the one or more of the first UEs.

9. A carrier aggregation platform, comprising:

one or more processors configured to:
 obtain device data regarding first user equipments (UEs) associated with a geographical area;
 determine, based on the device data, a data distribution of a plurality of make and model combinations of the first UEs;
 analyze the data distribution to identify one or more make and model combinations, of the plurality of make and model combinations, that satisfy a number threshold;
 determine carrier aggregation capabilities, associated with carrier aggregation, of a portion of the first UEs of the one or more make and model combinations,
  wherein the carrier aggregation capabilities indicate first frequency bands supported by the portion of the first UEs;
 determine one or more combinations of the first frequency bands and a number of downlinks and/or uplink layers for each first frequency band of the one or more combinations of the first frequency bands,
  wherein the one or more combinations of the first frequency bands and the number of downlinks and/or uplink layers are determined based on the carrier aggregation capabilities;
 obtain network data indicating a carrier aggregation configuration of a base station associated with the geographical area,
  wherein the carrier aggregation configuration identifies second frequency bands, a number of antennas for transmitting data, or a number of antennas for receiving data, and wherein the second frequency bands include one or more of the first frequency bands;
 determine carrier aggregation information based on the carrier aggregation configuration, the one or more combinations of the first frequency bands, and the number of downlinks and/or uplink layers,
  wherein the carrier aggregation information identifies a plurality of combinations of the second frequency bands and priorities associated with the plurality of combinations of the second frequency bands; and
 provide the carrier aggregation information to cause second UEs, associated with the base station, to utilize the plurality of combinations of the second frequency bands based on the priorities,
    wherein the second UEs include one or more of the first UEs.
10. The carrier aggregation platform of claim 9, wherein the one or more processors are further configured to:
    perform data validation on the device data to identify different variations of information identifying different make and model combinations,
        wherein the carrier aggregation capabilities are determined after performing the data validation.
11. The carrier aggregation platform of claim 9, wherein the one or more processors, to determine the carrier aggregation capabilities of the portion of the first UEs, are configured to:
    determine that a software adoption rate, of software implemented on the portion of the first UEs, satisfies an adoption rate threshold;
    determine the software implemented on the portion of the first UEs based on determining that the software adoption rate satisfies the adoption rate threshold; and
    determine the carrier aggregation capabilities based on the software implemented on the portion of the first UEs.
12. The carrier aggregation platform of claim 9, wherein the one or more processors, to obtain the device data, are configured to:
    obtain per call measurement data regarding the first UEs; and
    wherein the one or more processors, to determine the carrier aggregation capabilities, are configured to:
    determine that a software adoption rate, of software implemented on the portion of the first UEs, does not satisfy an adoption rate threshold, and
    determine the carrier aggregation capabilities of the portion of the first UEs using the per call measurement data regarding the portion of the first UEs based on determining that the software adoption rate does not satisfy the adoption rate threshold.
13. The carrier aggregation platform of claim 9, wherein the one or more processors are further configured to:
    receive additional device data regarding third UEs associated with the geographical area;
    determine updated carrier aggregation capabilities based on the additional device data;
    determine, based on the updated carrier aggregation capabilities, one or more updated combinations of frequency bands;
    determine updated carrier aggregation information based on the carrier aggregation configuration and the one or more updated combinations of frequency bands; and
    cause the second UEs to be configured based on the updated carrier aggregation information.
14. The carrier aggregation platform of claim 9, wherein the one or more processors, to determine the carrier aggregation information, are configured to:
    determine the plurality of combinations of the second frequency bands to support the one or more combinations of the first frequency bands and the number of downlinks and/or uplink layers.
15. The carrier aggregation platform of claim 9, wherein the one or more processors are further configured to:
    rank the one or more combinations of the first frequency bands; and
    wherein the one or more processors, to determine the carrier aggregation information, are configured to:
        determine a first one of the plurality of combinations of the second frequency bands based on a first one of the ranked one or more combinations of the first frequency bands; and
        determine a second one of the plurality of combinations of the second frequency bands based on a second one of the ranked one or more combinations of the first frequency bands.
16. A non-transitory computer-readable medium storing a set of instructions, the set of instructions comprising:
    one or more instructions that, when executed by one or more processors of a device, cause the device to:
        obtain device data regarding first user equipments (UEs) associated with a geographical area;
        determine, based on the device data, a data distribution of a plurality of make and model combinations of the first UEs;
        analyze the data distribution to identify one or more make and model combinations, of the plurality of make and model combinations, that satisfy a number threshold;
        determine carrier aggregation capabilities, associated with carrier aggregation, of a portion of the first UEs of the one or more make and model combinations,
            wherein the carrier aggregation capabilities indicate first frequency bands supported by the portion of the first UEs;
        determine one or more combinations of the first frequency bands, and a number of downlinks and/or uplink layers for each first frequency band of the one or more combinations of the first frequency bands,
            wherein the one or more combinations of the first frequency bands and the number of downlinks and/or uplink layers are determined based on the carrier aggregation capabilities;
        obtain network data indicating a carrier aggregation configuration of a base station associated with the geographical area,
            wherein the carrier aggregation configuration identifies second frequency bands, and wherein the second frequency bands include one or more of the first frequency bands;
        determine carrier aggregation information based on the carrier aggregation configuration, the one or more combinations of the first frequency bands, and the number of downlinks and/or uplink layers,
            wherein the carrier aggregation information identifies a plurality of combinations of the second frequency bands and priorities associated with the plurality of combinations of the second frequency bands; and
        provide the carrier aggregation information to cause second UEs, associated with the base station, to utilize the plurality of combinations of the second frequency bands based on the priorities,
            wherein the second UEs include one or more of the first UEs.
17. The non-transitory computer-readable medium of claim 16, wherein the one or more instructions, that cause the device to determine the carrier aggregation capabilities of the portion of the first UEs, cause the device to:
    determine that a software adoption rate, of software implemented on the portion of the first UEs, satisfies an adoption rate threshold;
    determine the software implemented on the portion of the first UEs based on determining that the software adoption rate satisfies the adoption rate threshold; and determine the carrier aggregation capabilities based on the software implemented on the portion of the first UEs.

18. The non-transitory computer-readable medium of claim 16, wherein the one or more instructions, that cause the device to obtain the device data, cause the device to:
obtain per call measurement data regarding the first UEs; and
wherein the one or more instructions, that cause the device to determine the carrier aggregation capabilities, cause the device to:
determine that a software adoption rate, of software implemented on the portion of the first UEs, does not satisfy an adoption rate threshold, and
determine the carrier aggregation capabilities of the portion of the first UEs using the per call measurement data regarding the portion of the first UEs based on determining that the software adoption rate does not satisfy the adoption rate threshold.

19. The non-transitory computer-readable medium of claim 16, wherein the one or more instructions, that cause the device to determine the carrier aggregation information, cause the device to:
determine the carrier aggregation information based on the second frequency bands, a number of antennas for transmitting data, a number of antennas for receiving data, the one or more combinations of the first frequency bands, and the number of downlinks and/or uplink layers.

20. The non-transitory computer-readable medium of claim 16, wherein the one or more instructions further cause the device to:
rank the one or more combinations of the first frequency bands; and
wherein the one or more instructions, that cause the device to determine the carrier aggregation information, cause the device to:
determine the plurality of combinations of the second frequency bands based on a first one of the ranked one or more combinations of the first frequency bands and a second one of the ranked one or more combinations of the first frequency bands.

* * * * *